United States Patent [19]

Couturier

[11] Patent Number: 5,802,128
[45] Date of Patent: Sep. 1, 1998

[54] DEVICE FOR RECOVERY OF FLUID CONTAINED IN THE COOLANT CIRCUIT OF A NUCLEAR REACTOR

[75] Inventor: Michel Couturier, Croissy sur Seine, France

[73] Assignee: Framatome, Courbevoie, France

[21] Appl. No.: 855,576

[22] Filed: May 13, 1997

[30] Foreign Application Priority Data

May 17, 1996 [FR] France ................................ 96 06161

[51] Int. Cl.⁶ ........................................... G21C 9/004
[52] U.S. Cl. ........................................ 376/283; 376/307
[58] Field of Search .................................... 376/283, 299, 376/307, 313, 314

[56] References Cited

U.S. PATENT DOCUMENTS

| | | | |
|---|---|---|---|
| 4,252,611 | 2/1981 | Mizumachi et al. | 376/283 |
| 5,180,543 | 1/1993 | Conway et al. | 376/299 |
| 5,259,008 | 11/1993 | Schulz | 376/283 |
| 5,309,487 | 5/1994 | McDermott et al. | 376/299 |

FOREIGN PATENT DOCUMENTS

| | | |
|---|---|---|
| 0 026 714 A1 | 4/1981 | European Pat. Off. . |
| 1 569 485 | 5/1969 | France . |
| 28 05 301 A1 | 9/1978 | Germany . |

*Primary Examiner*—Daniel D. Wasil
*Attorney, Agent, or Firm*—Pollock, Vande Sande & Priddy

[57] ABSTRACT

The recovery device includes a first tank containing a volume of water open in the inner space of the safety containment and a closed second tank isolated from the inner space of the safety containment. The second tank is smaller than the first tank, and is at least partly immersed in the water contained in the first tank. The inner volume of the immersed part of the second tank is placed in communication with the volume of water contained in the first tank by strainers. A discharge pipe is connected at one of its ends to a discharge point of the coolant circuit of the nuclear reactor and includes an end part opposite the discharge point opening into the interior of the second tank.

10 Claims, 2 Drawing Sheets

DEVICE FOR RECOVERY OF FLUID CONTAINED IN THE COOLANT CIRCUIT OF A NUCLEAR REACTOR

FIELD OF THE INVENTION

The invention relates to a device for recovery of fluid contained in the coolant circuit of a nuclear reactor and in particular a device for recovery of fluid contained in the primary circuit of a nuclear reactor cooled by pressurized water.

BACKGROUND OF THE INVENTION

Pressurized-water nuclear reactors comprise, within a safety containment, a vessel enclosing the core of the nuclear reactor and a primary coolant circuit connected to the vessel, in which pressurized water for cooling the nuclear reactor circulates.

The pressure in the primary circuit is maintained within a control range by a pressurizer which comprises electrical rod heaters and a spraying device.

The pressurizer is equipped with valves and/or release valves which make it possible to ensure some pressure control and protection against overpressures in the primary circuit. In the event of overpressure, the valves and/or relief valves make it possible to carry out a discharge of pressurized fluid contained in the primary circuit.

In some nuclear reactor plants, pressurized fluids contained in the primary circuit are directed, when discharged, towards a tank called a pressurizer discharge tank (PDT). The PDT discharge tank receives the discharges of fluid from the primary circuit originating from the pressurizer during the regular testing of the nuclear reactor between the stages of stopping and of restarting of the units of the nuclear reactor, or else the discharges of fluid released during the incidental transitional stages while the nuclear reactor is in operation. The PDT tank also makes it possible to collect the water, steam or hydrogen leakages which may appear when the discharge valves or relief valves exhibit sealing defects.

The PDT tank is equipped with means enabling the liquid arriving in the PDT to be discharged into the safety containment of the nuclear reactor in the event of a large discharge due to an accident condition on the nuclear reactor. The spraying system of the safety containment of the reactor is then responsible for the condensation of the steam released in the containment.

Some nuclear reactor plants of recent construction employ a large-capacity water reserve, contained in a cistern situated in the lower part of the safety building structure, in order to condense the large quantities of steam which may be discharged from the primary circuit in the event of an accident. Such a cistern containing a large-volume water reserve (for example 1500 to 2000 m³) forms a cistern for safeguard in the event of an accident and for filling of the reactor cavity. This cistern is generally called the IRWST (In Containment Refuelling Water Storage Tank) cistern.

The cistern is placed inside the concrete structures of the reactor building and may be of any shape. The internal volume of the cistern enclosing the water reserve communicates directly with the internal volume of the safety containment, via openings or inspection ports passing through the upper parts of its structure.

If such a cistern containing a large-volume water reserve is employed for condensing the steam discharges in the event of an accident, there is no need to install a spraying system inside the safety containment. All the discharges performed from the pressurizer and especially those performed during an accident of some seriousness (in which the pressurized fluids discharged from the pressurizer may contain a large quantity of hydrogen) are conveyed directly into the safeguard cistern, so as to produce the condensation of the steam by employing the large-volume water reserve held by the cistern.

However, such a design of a nuclear reactor comprising a cistern containing a large quantity of water into which the pressurized fluids originating from the primary circuit are discharged directly from the pressurizer exhibits some disadvantages.

In the event that the devices permitting the discharge of the pressurizer (valves or relief valves) have a sealing defect, hydrogen and radioactive gases may spread into the safety containment by passing through the water reserve cistern.

Furthermore, when regular testing of the pressurizer discharge devices is performed, the discharge gases are conveyed into the water reserve contained in the cistern, so that these gases may contain gaseous radioactive substances such as the iodine, xenon or argon which are present in the primary circuit. This may give rise to some contamination of the cistern containing the water reserve, with the result that access to the locations adjoining the cistern runs the risk of becoming limited.

These disadvantages could by avoided by installing a PDT tank between the pressurizer discharge and the cistern containing the water reserve, but the calculations of sizing the necessary components show that this design is very difficult to implement, in particular because of the size needed for the connecting pipework between the PDT tank and the cistern containing the water reserve, this connecting pipework being employed during large discharges which cannot be contained in the PDT tank.

SUMMARY OF THE INVENTION

The object of the invention is to propose a device for recovery of fluid contained in the coolant circuit of a water-cooled nuclear reactor, comprising, within a safety containment, a vessel containing the core of the reactor and the coolant circuit connected to the vessel, in which the water for cooling the reactor circulates, this device making it possible to recover the fluids in all cases of discharge of the primary circuit, in particular in the case of large discharge in an accident condition of the nuclear reactor, while ensuring condensation of the steam discharged and while avoiding any contamination of a part of the safety containment.

To this end, the device for recovery according to the invention comprises, within the reactor safety containment:

- a first tank containing a volume of water, open in the inner space of the safety containment,
- a closed second tank having dimensions which are smaller than those of the first tank, at least partially immersed in the water contained in the first tank,
- means for bringing the inner volume of an immersed part of the second tank into communication with the volume of water contained in the first tank, and
- a discharge pipe connected at one of its ends to a discharge point of the primary circuit and which has an end part opposite the primary circuit opening within the second tank.

The first tank preferably consists of a large-sized cistern placed in the concrete structures of the reactor safety building.

Also preferably, in the case of a pressurized-water nuclear reactor, the discharge point of the coolant circuit is situated at the discharge of a pressurizer ensuring the pressurization of the coolant water in the primary coolant circuit of the nuclear reactor.

BRIEF DESCRIPTION OF THE DRAWINGS

To make the invention properly understood, a description will now be given, by way of example and, with reference to the drawings, of an embodiment of a device for recovery of fluid in accordance with the invention and, by way of comparison, the primary coolant circuit of a nuclear reactor cooled by pressurized water, comprising a pressurizer discharge tank.

DESCRIPTION OF PREFERRED EMBODIMENT

Figure 1:
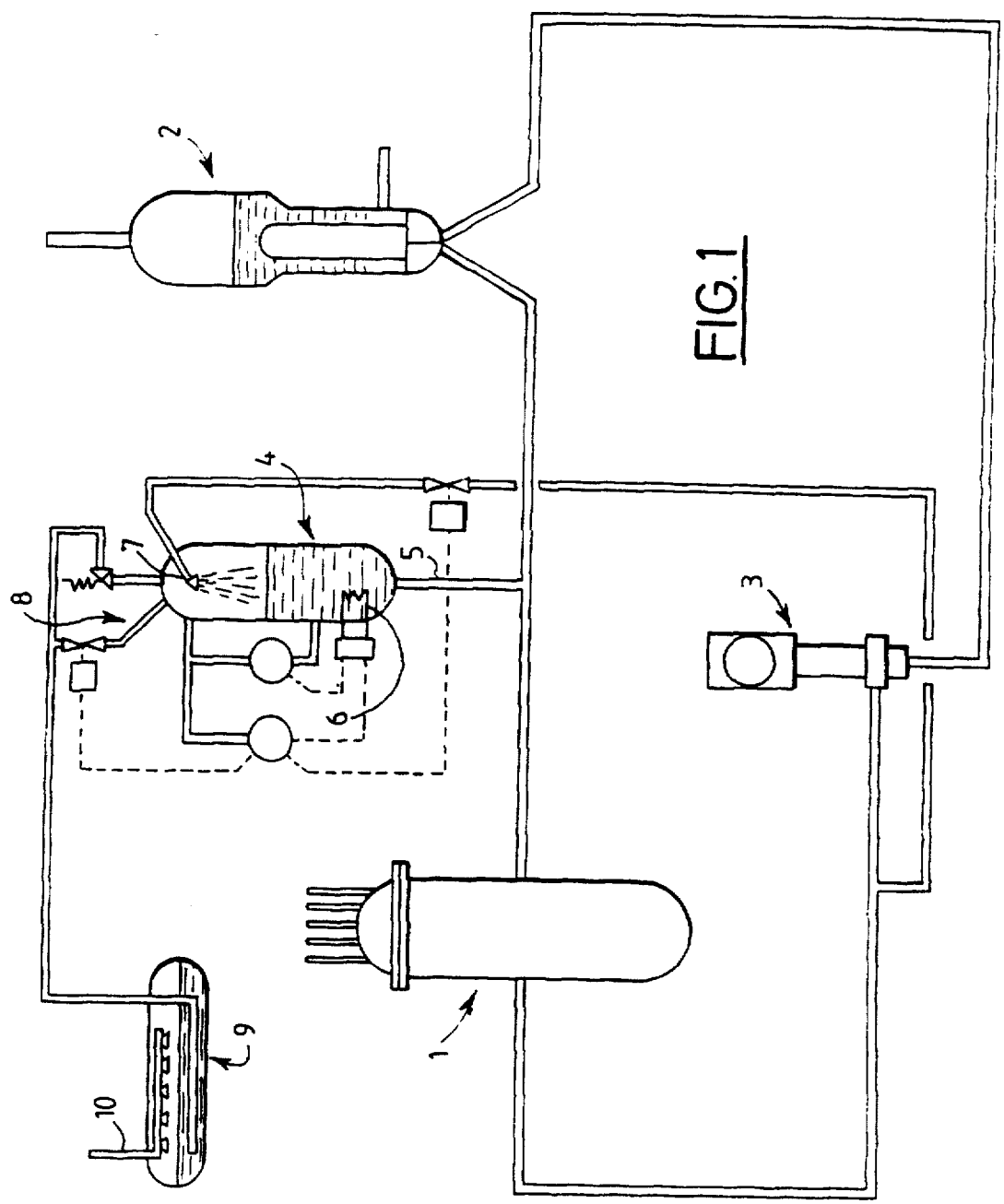
FIG. 1 is a schematic view of a primary circuit of a prior art pressurized-water nuclear reactor.

FIG. 1 shows a part of the primary circuit of a pressurized-water nuclear reactor, placed within the safety containment of the nuclear reactor.

The vessel 1 containing the core of the nuclear reactor is connected to the primary circuit, which comprises a number of loops in each of which a steam generator is placed. FIG. 1 shows, schematically, a primary circuit loop comprising a steam generator 2 and a primary pump 3 ensuring the circulation of the pressurized coolant water of the nuclear reactor inside the loop.

A pressurizer 4 enables the pressure in the primary circuit to be maintained at a value included within a control range. The pressurizer 4 comprises a closed casing which is connected via an expansion line 5 to a pipe of a primary circuit loop.

The control of the pressure inside the pressurizer casing 4 and in the primary circuit is ensured by means of electrical heaters 6 extending to the pressurizer casing and of a spraying device 7. Means of control enable the electrical heaters 6 and the spraying device 7 to be brought into action as a function of the pressure measured in the primary circuit.

In addition, the pressurizer 4 comprises safety discharge means 8 consisting of valves and relief valves which are capable of opening in the event of an overpressure within the pressurizer casing. In the event of a discharge, fluids contained in the pressurizer and in the primary circuit are conveyed into a pressurizer discharge tank (PDT). The steam discharged by the pressurizer is condensed in the PDT tank, by virtue of the mass of water contained in the PDT and of a spray ring 10.

The PDT tank 9 comprises means for discharge (not shown) which are capable of being opened when the PDT tank receives large quantities of gaseous substances during a discharge due to an accidental operation of the nuclear reactor. In this event, radioactive substances are liable to spread into the safety containment. The condensation of the steam released in the safety containment by the PDT tank must be ensured by the spraying system of the safety containment.

Figure 2:
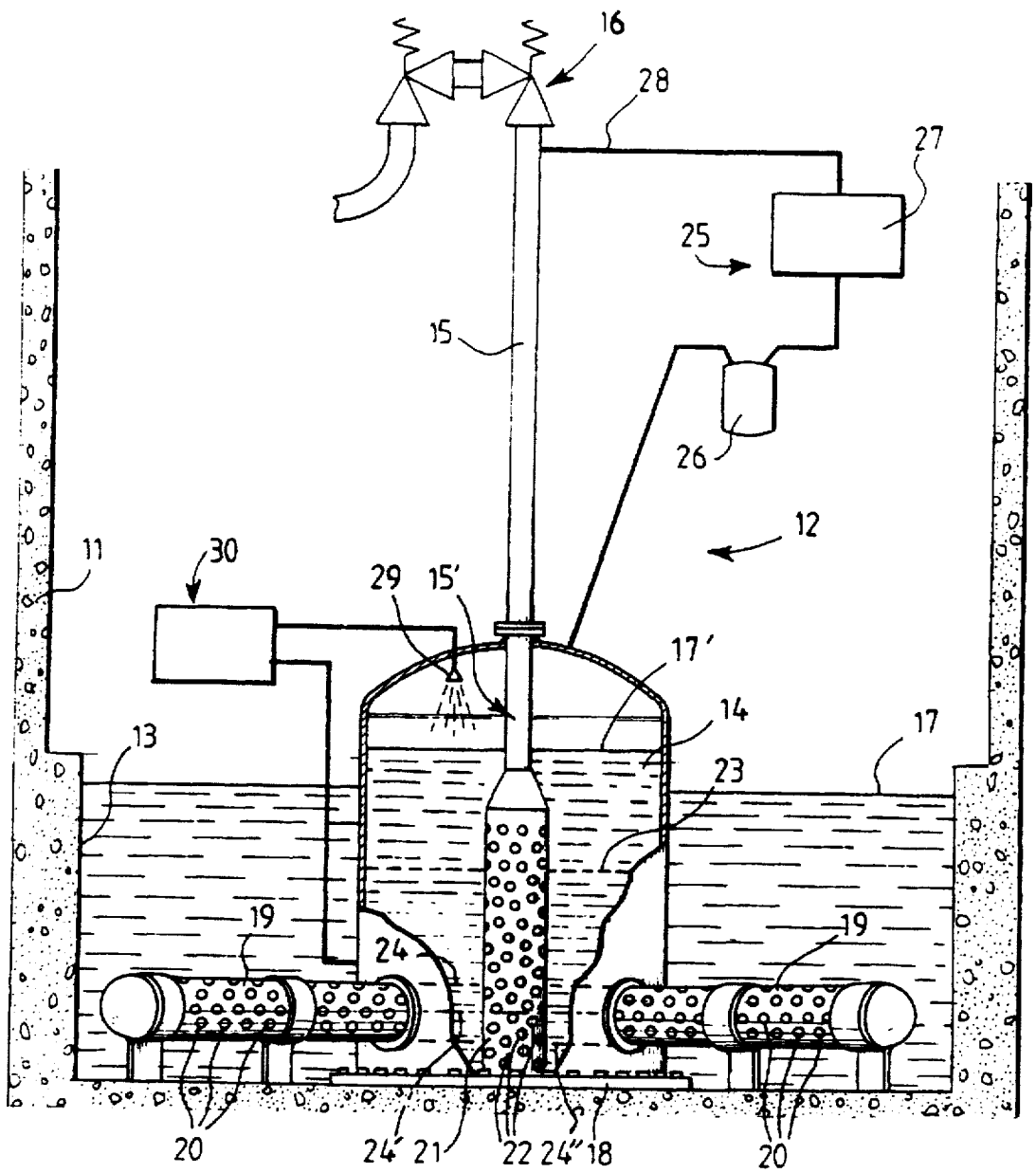
FIG. 2 is a view in elevation and in partial section of a device for recovery of fluid in accordance with the invention, employed for recovery of primary circuit fluid of a pressurized-water nuclear reactor.

FIG. 2 shows a recovery device 12 in accordance with the invention, placed within the safety containment 11 of a pressurized-water nuclear reactor.

The recovery device 12 comprises a first tank 13 of very large capacity, a second tank 14 whose dimensions are appreciably smaller than those of the first tank 13, and a discharge pipe 15 connected to the discharge devices 16 at one end of the pressurizer and opening within the second tank 14 at its opposite end.

The first tank 13 is placed in the concrete structure of the lower part of the safety containment 11 and contains water up to a level 17. The tank 13 is open at its upper part, with the result that the upper level 17 of the water is directly in contact with the atmosphere prevailing within the safety containment 11.

The tank 13 contains a very large volume of water, for example of the order of 1500 to 2000 m$^3$, the capacity of the first tank 13 being similar to the capacity of a the cavity of a nuclear reactor.

In a preferred embodiment, the first tank 13 consists of a cistern for safeguard in the event of an accident and for filling of the reactor cavity, or an IRWST cistern, which is provided for in the structure of the building of some nuclear reactors.

The second tank 14 is in the form of a bell made of steel sheet which may be secured, by means of a flange 18 bolted to the bottom of the first tank 13. As shown in FIG. 2, the second tank 14 may consist of a cylindrical wall closed by a dome at one of its ends and integrally attached to the securing flange 18 at its opposite end.

The second tank 14 has dimensions which are appreciably smaller than those of the first tank 13, with the result that its capacity is very appreciably smaller than the capacity of the tank 13. This capacity may be of the order of 20 to 60 m$^3$.

The tank 14 is partially immersed within the water mass of water contained in the first tank 13, the height of the tank 14 being greater than the depth of water within the tank 13. The emerging part of the tank 14 in contact with the atmosphere filling the internal volume of the safety containment 11 is completely closed.

In its immersed part, slightly above the flange 18 secured to the bottom of the first tank 13, the second tank 14 comprises openings passing through its wall, at each of which a pipe 19 pierced with holes 20 is secured, in an arrangement which is substantially horizontal and maintained by supports secured to the bottom of the first tank 13. The pipes 19 which communicate with the internal volume of the tank 14, in its immersed part, form strainers which ensure that the internal volume of the tank 14 is brought into communication with the mass of water filling the first tank 13 up to the level 17. The axis of the pipes 19 forming strainers is situated approximately three meters below the upper level 17 of the water in the first tank 13.

The means 16 for discharging the pressurizer consist, for example, of a safety relief valve and a discharge valve which is actuated when the pressure in the pressurizer exceeds a predetermined value, or when actuated by the operator in control. If this pressure is exceeded, the signal is emitted by at least one pressure sensor associated with the pressurizer and is transmitted to a control module of the discharge valve so as to order the valve to open. Steam and gases contained in the pressurizer casing are then discharged through discharge pipe 15, within the tank 14. The discharge continues as long as the pressure in the pressurizer has not returned to a level lower than a level at which the discharge valve is ordered to close.

The means 16 for discharging the pressurizer could also consist of servo-controlled relief valves whose opening is triggered when the pressure in the pressurizer chamber exceeds a pH determined value.

The discharge pipe 15 is extended, within the second tank 14, by a pipe 15' extending vertically along the axis of the tank 14, and having a part of widened diameter 21 which is pierced with openings 22 and forms a strainer through which the steam and the gases originating from the primary circuit are discharged within the second tank 14.

The upper part of the second tank 14, part which remains emerging above the level 17 in the first tank 13, is connected to a circuit 25 for separation and treatment of the gases. The circuit 25 comprises, in series, a separator tank 26 and a gas treatment circuit 27. The gas treatment circuit 27 is maintained at a pressure which is lower by approximately 1 meter of water head than the pressure in the tank 14. The gases contained in the upper part of the second tank 14 are thus drawn out through the separator tank 26 and the treatment circuit 27, which ensures a purification of the gases. The gas treatment circuit 27 is also connected by a conduit 28 to the discharge pipe 15, at a point situated slightly downstream of the means 16 for discharging the pressurizer. The purging gases travel successively in the pipes 28, 15 and 22 and then the circuit 25, and this makes it possible to avoid accumulations of hydrogen in the pipes and in the discharge line 15 in the event of leakiness of the means 16 for discharging the pressurizer.

In the absence of gas discharge into the second tank 14, the water level in this second tank is therefore established in accordance with a level 17' which is approximately one meter higher than the level 17 of the water in the first tank 13, the two tanks 13 and 14 being in communication via strainers 19.

In the event of a discharge which is limited in volume, as a function of the pressure and of the flow rate of the steam and of the discharge gases, the water level 23 in the second tank 14 is temporarily established in an intermediate position between the upper level 17 and a lower level 24 situated substantially in the horizontal plane corresponding to the upper generatrix of the strainers 19.

The steam discharged by the conduit 15 into the second tank 14 is condensed within the mass of water contained in the second tank 14.

In addition, the dangerous gases such as hydrogen, or the radioactive gases, such as iodine, xenon or argon, originating from the primary circuit and mixed with the steam, are separated from the steam when this steam is condensed in the second tank 14 and collect in the bell-shaped upper part of the second tank 14. The dangerous or radioactive gases which collect above the water level 23 in the second tank 14 are confined in the completely leakproof upper part of the tank 14 and cannot spread within the safety containment. These gases are subjected to a pressure which is equal to the height of the water head between the levels 23 and 17.

In the event of a larger discharge of steam and gases, for example in the event of a discharge caused by an accident condition in the nuclear reactor, the water level 23 in the tank 14 can drop as far as the level 24' situated substantially in the horizontal plane containing the axes of the strainers 19, the steam being then discharged directly within the first tank 13 through strainers 19. The condensation of the steam is then ensured directly by the large mass of water contained in the first tank 13.

As soon as the water level reaches the level 24 of the strainers 19, automatic control of the steam condensation is produced, because the openings 20 of the strainers 19 are gradually uncovered and can let the steam discharged pass directly into the second tank 14. The gradual uncovering of the openings 19 is obtained by the lowering of the water level in the tank 14 under the effect of the discharge flow rate and pressure.

When, in a steady state, the water level in the second tank 14 is in its lowest position 24", the gases retained within the tank 14 are subjected to a pressure of the order of 3 meters of water head, corresponding to the distance between the levels 17 and 24".

The pressurizing of the tank 14 is therefore limited to this overpressure corresponding to the height of the water head between the levels 17 and 24".

When regular testing of the means for discharging the pressurizer is performed, steam and gases contained in the primary circuit are conveyed into the second tank 14 of the device for recovery via the discharge pipe 15. The steam is condensed and the active gases from the primary circuit are trapped in the upper part of the second tank 14. These gases are then subjected to a treatment in the circuit 25. This avoids any contamination of the water contained in the first tank 13 which may be, for example, a cistern for safeguard in the event of accident and for filling of the reactor cavity at the time of refuelling operations.

In addition, the immersed part of tank 14 is connected to a purification circuit 30 of the nuclear reactor, ensuring the purification of substances in liquid phase. The water contained in the second tank 14, possibly containing dissolved substances originating from the discharge, is purified by the circuit 30 and reintroduced into the upper part of the second tank 14 via a spraying device 29. Any significant dispersion of dangerous or radioactive products within the first tank 13 is thus avoided.

The device for recovery in accordance with the invention makes it possible to condense the steam originating from the primary circuit in a highly efficient manner, as a result of the very large volume of water contained by the first tank 13. In addition, the dangerous or radioactive gases originating from the primary circuit and entrained by the discharge are retained in the second tank, with the result that they cannot contaminate the water reserve of the first tank, which is open within the safety containment. Any contamination of this water reserve and of the safety containment is thus avoided.

The first tank 13 may consist equally well of a cistern of very large capacity provided in the design of some nuclear reactors and placed in the concrete structure of the safety containment, and of any tank of very large capacity, placed within the safety containment and containing a large mass of water. Such a tank, designed especially for containing a large mass of water from condensation of steam discharge originating from the primary circuit, can also be employed for other purposes in the context of the utilization of the nuclear reactor.

The discharge pipe of the device for recovery of fluid may be connected to a point of the primary circuit of the reactor which is other than the means for discharging the pressurizer.

Finally, the second tank placed within the first tank may differ in form and structure from that which has been described.

The invention applies not only to nuclear reactors cooled by pressurized water but also to other water-cooled reactors such as, for example, boiling-water nuclear reactors.

I claim:

1. In a water-cooled nuclear reactor comprising a safety containment and, inside the safety containment, a vessel, a reactor core enclosed in the vessel and a coolant circuit connected to the vessel, a device for recovering fluid contained in the coolant circuit comprising, within the safety containment of the reactor:

(a) a first tank containing a volume of water open in an inner space of the safety containment;

(b) a second tank isolated from the inner space of the safety containment, said second tank having dimensions which are smaller than the dimensions of the first tank and being at least partially immersed in the water contained in the first tank, and second tank being in the form of a bell comprising a cylindrical wall having a closed end located above an upper level of the volume of water within the first tank and an opposite end secured to a bottom of the first tank;

(c) means for bringing the inner volume of an immersed part of the second tank into communication with the volume of water contained in the first tank; and (d) a discharge pipe connected at one of its ends to a discharge point of the coolant circuit of the reactor and having an end part opposite to the discharge point of the coolant circuit opening within the second tank.

2. The device according to claim 1, wherein the means for bringing the inner volume of the immersed part of the second tank into communication with the volume of water contained in the first tank consist of at least one pipe having a wall traversed by passage openings immersed in the volume of water contained in the first tank, and communicating, at one of its ends, with the inner volume of the immersed part of the second tank.

3. The device according to claim 1, wherein said opposite end of said second tank is secured to the bottom of the first tank through a securing flange.

4. The device according to claim 1, wherein the discharge pipe comprises an extension within the second tank, forming a strainer of tubular shape traversed by passage openings.

5. The device according to claim 1, wherein an upper part of the second tank ensuring the collection of gases is connected to a circuit for gas separation and treatment, placed in the safety containment of the nuclear reactor.

6. The device according to claim 5, wherein an exit of the gas separation and treatment circuit is connected by a purging pipe to the discharge pipe.

7. The device according to claim 1, wherein a lower part of the second tank is connected to a circuit for purification of liquid substances, placed in the safety enclosure of the nuclear reactor.

8. The device according to claim 7, wherein an exit of the circuit for purification of liquid substances is connected to a spraying device placed within the second tank.

9. The device according to claim 1, for the recovery of fluid contained in the primary coolant circuit of a nuclear reactor cooled by pressurized water, comprising, within the safety containment, a cistern for safeguard in the event of accident and for filling of a reactor cavity, wherein the first tank consists of the cistern for safeguard and for filling of the nuclear reactor.

10. The device according to claim 1, for the recovery of fluid contained in the primary coolant circuit of a nuclear reactor cooled by pressurized water, comprising a pressurizer ensuring the maintenance of the pressure in the primary coolant circuit within a predetermined range, and including means for discharging, wherein the discharge pipe is connected to the means for discharging the pressurizer.

* * * * *